UNITED STATES PATENT OFFICE.

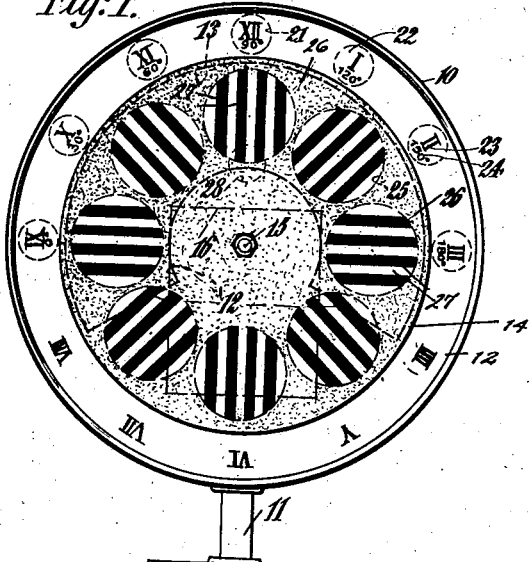

NATHAN A. SHIGON, OF NEW YORK, N. Y.; SOPHIE SHIGON ADMINISTRATRIX OF SAID NATHAN A. SHIGON, DECEASED.

FIXATION AND ASTIGMATIC CHART.

1,369,136.

Specification of Letters Patent. Patented Feb. 22, 1921.

Application filed April 25, 1918. Serial No. 230,665.

*To all whom it may concern:*

Be it known that I, NATHAN A. SHIGON, a citizen of the United States, and a resident of the borough of the Bronx, county of the Bronx, city and State of New York, have invented certain new and useful Improvements in Fixation and Astigmatic Charts, of which the following is a specification.

The present invention relates to an improved fixation and astigmatic chart, and has for an object to provide a chart which may be used for testing astigmatism or as a fixation chart for testing acuteness of vision, and making opthalmoscopic, retinoscopic or phorometer tests.

With the charts heretofore in use, these tests have been very unreliable, principally because of the change of sensation which takes place, even in normal eyes after attempting to look fixedly at one spot for any length of time. It is known through experiment, that if a person looks for a minute or two at an object of black and white, or an astigmatic chart consisting of black lines on a white background, and then removes that chart from a background consisting of the same white material, the image of the black lines will appear whiter than the background, and the background will appear gray in comparison with the imaginary white lines. In viewing radial lines or other markings upon a test chart, those markings which at first appeared the clearest become less distinct, and other markings which were less distinct become more distinct, so that the person himself becomes puzzled as to the correct impression he obtains and the test is rendered difficult and uncertain as to its results in a great many tests.

In testing for astigmatism, it is of prime importance that the real impression be ascertained in order to provide the proper correction. The defect of astigmatism is the condition where one meridian of the eyeball or cornea is more curved than the meridian at right angles to it, so that the rays entering the eye from an object-like figure as Fig. 6, do not form a clear image on the retina of the eye in all meridians. The rays entering the eye through the more curved meridian will refract more than those rays entering through the less curved meridian with the result, for example, that the vertical lines will be clear, or nearly so, and the horizontal lines blurred or not as clear as the vertical lines. This is corrected by applying suitable cylindrical lenses so that the object appears clear in all of its meridians. During the process of applying lenses in testing the eyes, the patient, as above pointed out, changes his sensation so that the proper correction cannot be reliably made.

In making a fixation test, the eye should accommodate a certain amount if an object is at a given distance, or in other words, this distance should be the point of direct stimulation of the fovea centralis of each eye. In making corrective tests for defective vision, the change of sensation caused by looking steadily for any length of time at a fixed point affects the accommodation and causes these tests also to be unreliable.

I propose in the present invention to provide a chart which will obviate these disadvantages, and as one embodiment of the invention, I provide an astigmatic or test chart that rotates or moves with a pulsatic or intermittent movement, so that while the chart is stationary, at intervals, the positions of the black and white portions are constantly changed, so that as the successive markings move into relation with fixed points, they will occupy positions at variance with the previous markings. Therefore, as the gaze is not fixed upon a stationary object for a long period, the sensation does not change as the impression upon the retina does not have a chance to become adverse to the black and white objects, as the image is focused in different positions on the retina.

The principle may be applied in a fixation chart either by bringing before the patient's eye pulsatively a repetition of a given black image or a succession of different images, as for instance, the letters of the alphabet. In this way the chance of a false impression produced by the constant appearance of the same image in the same position is avoided and proper correction may be made with certainty.

I further propose to provide a neutral color chart, as for instance gray, with groups of black and white markings.

While I do not desire to limit myself to a chart having pulsatic movement, I find that such a chart is best suited to obtaining a clear image upon the patient's eye for a considerable period of time, and to the making of perfect tests.

A further object is to provide an illuminated chart which will both clarify the markings of the chart from the back and enable its use in a dark room.

With these and other objects in view, an embodiment of my invention is shown in the accompanying drawings, and this embodiment will be hereinafter more fully described with reference thereto, and the invention will be finally pointed out in the claims.

In the accompanying drawings;

Figure 1 is a front elevation of one embodiment of my invention;

Fig. 2 is a vertical sectional view thereof;

Figs. 3, 4 and 5 are fragmentary views showing three successive positions of the chart with relation to a fixed point;

Fig. 6 shows a form of chart now in use, and which may be used with my invention;

Fig. 7 shows a further modified form of chart and the device adapted to a fixation test;

Fig. 8 is a longitudinal sectional view of a further modified form; and

Fig. 9 is a front elevation thereof.

Similar reference characters indicate corresponding parts throughout the several figures of the drawings.

Referring to the drawings, the first embodiment of my invention therein shown comprises a casing 10 mounted upon a supporting stand 11, or the same may be provided with means for hanging on a wall.

A stationary circular plate 12, provided with an arcuate opening 13 in its upper portion, is mounted on the front end of the casing, and a circular chart plate 14 of somewhat smaller diameter is concentrically and rotatively mounted thereon, being supported upon a shaft 15 connected to a mechanism 16 adapted to rotate the same intermittently so that the chart is turned pulsatively; that is, it will make a complete revolution in a given number of movements, the chart being stationary for a short period between each movement. The mechanism 16 may be spring operated, as shown, being provided with a spring 18, gears 19 and an escapement 20 coöperating with a balance wheel $20^a$ and hair spring $20^b$, somewhat similar to that of a clock, or it may be driven by electric impulses or other suitable means. The opening 13 is covered by the plate 14, and at the outside of the periphery of said plate 14 there are provided in the upper half of the plate 12 equally spaced openings 21. A translucent layer 22 of canvas, celluloid or the like is provided above the plate 12, and within the openings 21, and in the same relation in the lower half there are printed indicia 23, corresponding to the numbers of a clock face, although other characters, such as the letters of the alphabet, etc. may be employed, and in the upper half these are supplemented by designations 24 indicating the degrees of inclination of the markings on the plate 14, hereinafter referred to.

The plate 14 is of opaque or translucent material, and is provided with a plurality of radially disposed circular openings 25, these being preferably of a number prime to the number of pulsations to a complete revolution of the plate. A cover layer 26 of canvas, celluloid or other material pervious to light, is secured to the plate 14, and is provided with black and white line markings 27 above the openings. These line markings are arranged in groups, as is usual in astigmatic charts, the central line of each group being radial, while the other lines are parallel thereto. The remainder of the plate is preferably of a neutral color, as for instance gray, and will have no detractive effect upon the eye.

An electric light 28 is provided in the casing in such position that it illuminates the markings in the upper half through the openings 13 and openings 25, and also the indicia in the upper part of the plate 12 are illuminated through the openings 21. It is only essential that the upper part of the chart including the horizontal markings be used in making a test.

In viewing a chart of this character, lines in one direction will appear clearer than those in another direction to an astigmatic eye, and this is corrected by applying cylindrical lenses to the eye until the lines in all meridians appear equally clear. With the old forms of stationary charts, these tests have been rendered unreliable because of the fact, as above pointed out, that the sensation of the patient's eye changes after looking steadily at the stationary black and white markings for a considerable period.

In carrying out a test with the present chart, the chart plate 14 is set in motion, and by reason of the prime relation of the number of groups of markings to the number of pulsatic movements to a complete revolution, these successive markings occupy a variable position with relation to a fixed point on the plate 12. By thus relieving the eye of the effect of a stationary object, or an object constantly appearing in the same spot on the retina, the sensation does not change and the test may be made with certainty. This is due to the fact that a patient watches a movable object more closely than a stationary one. Figs. 3 to 5 show the plate 14 in three successive positions with relation to a fixed point on the plate 12. With certain escapement mechanisms there may be a slight stop or jumping movement between the main stopping positions.

In Fig. 6, I have illustrated a form of chart 29 having markings 30 in different arrangement than the markings of the first embodiment of my invention. This is a well known form of chart which may be used with my improvements.

For a fixation test, a cover plate 31 (Fig. 7) is placed over the chart, being provided with an opening 32 adapted to expose one group of markings, but which is of such size as to accommodate the succeeding group before the first group becomes covered. I have illustrated the cover plate as applied to a pulsatively rotating chart having groups of letters of different sizes printed radially thereon, but it will be understood that the same may be applied to the form shown in Fig. 1 in a similar manner. Other markings, as for instance groups of dots, may also be employed.

In Figs. 8 and 9, I have shown a modified form of fixation test chart, in which the letters or other characters 33 are provided in groups upon a curtain chart 34, mounted upon a roller 35, and a winding roller 36, either or both of which may be springs, the letters adapted to be pulsatively and automatically moved in front of an opening 37 of the casing 38 by an escapement mechanism 39 adapted to pull a cord 40 connected to pulleys 41 and 42 provided upon the ends of the rollers 35 and 36, the said escapement being placed near the point from which the patient views the chart, and where it may be controlled by the examiner. The device may be operated by other suitable means, as for instance, electrically or by hand operated mechanism, and the escapement may if desired be connected directly to the rollers. The chart can be made of translucent material, and an electric light 43 is provided behind the same to illuminate the markings.

The form shown in Fig. 1 may also be operated from a distance if desired.

I have illustrated preferred and satisfactory embodiments of my invention, but it is obvious that changes may be made therein within the spirit and scope thereof, as defined in the appended claims.

I claim:—

1. An eye testing chart comprising a movable member having spaced-apart eye testing markings thereon, and means for intermittently moving said member, the number of said eye testing markings being prime to the number of intermittent movements of said means, whereby said eye testing markings may be successively moved into variable relation with respect to a fixed point on the retina of the eye.

2. An eye testing chart comprising a movable member having spaced-apart eye testing markings thereon, and means for intermittently moving said member, the number of said eye testing markings being less than and prime to the number of intermittent movements of said means and said means having positive connection with said member whereby said eye testing markings may be positively and successively moved into variable relation with respect to a fixed point on the retina of the eye.

3. An eye testing chart comprising a movable member provided with radially disposed groups of eye testing markings spaced apart thereon, and means positively connected to said movable member for intermittently advancing the same, the number of intermittent movements of said means to complete a cycle of operation being prime to the number of groups of eye testing markings on said member whereby said eye testing markings may be successively and positively moved into variable relation with respect to a fixed point on the retina of the eye.

4. An eye testing chart comprising a stationary member provided with angular indicia thereon, a movable member arranged for movement with respect to the stationary member and provided with eye testing markings thereon, means for illuminating said stationary member, and means for intermittently advancing the movable member in a number of steps in a complete cycle greater than the number of eye testing markings and the latter being prime in number to the number of steps of said means.

In testimony that I claim the foregoing as my invention, I have signed my name.

NATHAN A. SHIGON.